(12) United States Patent
Zhang et al.

(10) Patent No.: US 12,322,825 B2
(45) Date of Patent: Jun. 3, 2025

(54) STRUCTURALLY MOUNTABLE BATTERY

(71) Applicant: Apple Inc., Cupertino, CA (US)

(72) Inventors: Michael P. Zhang, Fremont, CA (US); Hirotsugu Oba, Sunnyvale, CA (US); Tyler S. Atura Bushnell, San Francisco, CA (US); Brad G. Boozer, Campbell, CA (US); Woojin Jung, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 470 days.

(21) Appl. No.: 17/838,755

(22) Filed: Jun. 13, 2022

(65) Prior Publication Data

US 2023/0116906 A1    Apr. 13, 2023

Related U.S. Application Data

(60) Provisional application No. 63/248,242, filed on Sep. 24, 2021, provisional application No. 63/248,254, filed on Sep. 24, 2021.

(51) Int. Cl.
*H01M 50/262* (2021.01)
*H01M 10/0525* (2010.01)
(Continued)

(52) U.S. Cl.
CPC ..... *H01M 50/262* (2021.01); *H01M 10/0525* (2013.01); *H01M 50/202* (2021.01); *H01M 50/204* (2021.01); *H01M 50/224* (2021.01); *H01M 50/231* (2021.01); *H01M 50/244* (2021.01); *H01M 50/247* (2021.01); *H02J 7/0063* (2013.01); *H01M 2220/30* (2013.01)

(58) Field of Classification Search
None
See application file for complete search history.

(56) References Cited

U.S. PATENT DOCUMENTS

| 2010/0178553 A1* | 7/2010 | Murata | ............... | H01M 50/121 |
| | | | | 429/186 |
| 2014/0113183 A1* | 4/2014 | Li | ....................... | H01M 50/534 |
| | | | | 429/163 |

(Continued)

FOREIGN PATENT DOCUMENTS

CN    204155182 U  *  2/2015

OTHER PUBLICATIONS

Machine Translation of CN 204155182U (Year: 2015).*

*Primary Examiner* — Gregg Cantelmo
(74) *Attorney, Agent, or Firm* — BakerHostetler

(57) ABSTRACT

The disclosed technology relates to a battery pack configured to be structurally mounted to a portable electronic device. The battery pack may comprise an enclosure configured to enclose a plurality of layers. One or more primary brackets may be connected to at least one wall of the enclosure. Each of the one or more primary brackets may be configured to be coupled to a device. The battery pack may be configured to provide at least one component of the device with power when the one or more primary brackets are coupled to the device. A protector may be interposed between at least one of the one or more primary brackets and the at least one wall of the enclosure. The protector may be configured to provide a layer of protection between the at least one primary bracket and the plurality of layers.

20 Claims, 12 Drawing Sheets

(51) Int. Cl.
  *H01M 50/202* (2021.01)
  *H01M 50/204* (2021.01)
  *H01M 50/224* (2021.01)
  *H01M 50/231* (2021.01)
  *H01M 50/244* (2021.01)
  *H01M 50/247* (2021.01)
  *H02J 7/00* (2006.01)

(56) References Cited

U.S. PATENT DOCUMENTS

| | | | |
|---|---|---|---|
| 2014/0218878 A1* | 8/2014 | Choi | H04M 1/0262 361/752 |
| 2014/0220390 A1* | 8/2014 | Park | H01M 50/247 429/7 |
| 2019/0204869 A1* | 7/2019 | Chang | G06F 1/1656 |

* cited by examiner

STRUCTURALLY MOUNTABLE BATTERY

PRIORITY

The disclosure claims the benefit under 35 U.S.C. § 119(e) of U.S. Provisional Patent Application No. 63/248,254 entitled "Structurally Mountable Battery", filed on Sep. 24, 2021, and U.S. Provisional Patent Application No. 63/248,242 entitled "Structurally Mountable Battery", filed on Sep. 24, 2021, both of which are incorporated herein by reference in their entirety.

TECHNICAL FIELD

The present disclosure relates generally to battery cells, and more particularly, to a battery cell configured to be structurally mounted to a portable electronic device.

BACKGROUND

Batteries are used to provide power to a wide variety of portable electronic devices, including laptop computers, tablet computers, mobile phones, personal digital assistants (PDAs), digital music players, watches, and wearable devices.

Batteries are commonly connected to the portable electronic devices using an adhesive. Such adhesive may prevent the battery from moving around within the device. However, such adhesive may cause issues in the battery-replacement process and/or the battery design process.

SUMMARY

The disclosed embodiments provide for a battery pack that is configured to be structurally mounted to a portable electronic device. The battery pack includes an enclosure configured to enclose a plurality of layers. One or more primary brackets may be connected to at least one wall of the enclosure. Each of the one or more primary brackets is configured to be coupled to a device. The battery pack is configured to provide at least one component of the device with power when the one or more primary brackets are coupled to the device. The battery pack includes a secondary bracket interposed between at least one of the one or more primary brackets and the at least one wall of the enclosure. The secondary bracket is configured to provide a layer of protection between the at least one primary bracket and the plurality of layers.

In some embodiments, a portable electronic device is disclosed. The portable electronic device includes a set of components powered by a battery pack and a device enclosure configured to receive the battery pack. The battery pack includes an enclosure configured to enclose a plurality of layers. The battery pack includes one or more primary brackets connected to at least one wall of the enclosure. Each of the one or more primary brackets is configured to be coupled to the device enclosure. The battery pack is configured to provide the set of components with power when the one or more primary brackets are coupled to the device enclosure. The battery pack includes a secondary bracket interposed between at least one of the one or more primary brackets and the at least one wall of the enclosure. The secondary bracket is configured to provide a layer of protection between the at least one primary bracket and the plurality of layers.

In some embodiments, a battery pack is enclosed. The battery pack includes a plurality of layers and an enclosure. The enclosure includes a first surface and a plurality of walls that extend from the first surface in a direction perpendicular to the first surface. A portion of the first surface extends past at least one wall of the plurality of walls. The enclosure includes a second surface configured to be connected to the plurality of walls to form a body configured to enclose the plurality of layers. The portion of the first surface is configured to be coupled to a device and the battery pack is configured to provide at least one component of the device with power when the portion of the first surface is coupled to the device.

In some embodiments, a portable electronic device is disclosed. The portable electronic device includes a set of components powered by a battery pack and a device enclosure configured to receive the battery pack. The battery pack includes a first surface and a plurality of walls that extend from the first surface in a direction perpendicular to the first surface. A portion of the first surface extends past at least one wall of the first plurality of walls. The enclosure includes a second surface configured to be connected to the plurality of walls to form a body configured to enclose a plurality of layers. The portion of the first surface is configured to be coupled to the device enclosure and the battery pack is configured to provide at least one component of the device with power when the portion of the first surface is coupled to the device enclosure.

In some embodiments, a battery enclosure is disclosed. The battery enclosure includes a first surface and a plurality of walls that extend from the first surface in a direction perpendicular to the first surface. A portion of the first surface extends past at least one wall of the first plurality of walls. The enclosure includes a second surface connected to the second plurality of walls to form a body configured to enclose a plurality of layers. The portion of the first surface is configured to be coupled to a device enclosure. The battery pack is configured to provide at least one component of the device with power when the portion of the first surface is coupled to the device enclosure.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Batteries are used to provide power to a wide variety of portable electronic devices, including laptop computers, tablet computers, mobile phones, personal digital assistants (PDAs), digital music players, watches, and wearable devices.

Batteries are commonly connected to the portable electronic devices using an adhesive. Such adhesive may prevent the battery from moving around within the device. However, such adhesive may cause the battery-replacement process to be difficult and/or costly. For example, removing and replacing a battery that has been connected to a portable electronic device using adhesive may damage the battery and/or the portable electronic device.

Such adhesive may cause inflexibility in the battery-design process. Batteries, such as lithium-ion batteries, may swell during use. For example, a battery may balloon outwards during use. It may not be possible to control the direction of such swelling due to the use of adhesive. If one side of the battery is attached to an adhesive, then that side of the battery may not be capable of swelling. The other side of the battery that is not attached to the adhesive may necessarily be the side of the battery that swells.

Accordingly, there is a need for batteries that may be attached to portable electronic devices without the use of adhesive. The disclosed technology addresses the foregoing limitations of conventional batteries packs by introducing a battery pack configured to be structurally mounted to a portable electronic device.

Figure 1B:
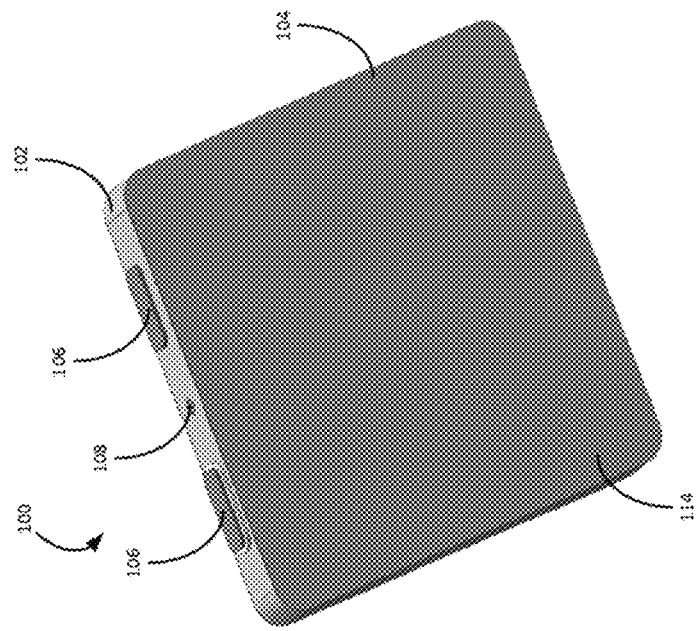
FIG. 1B is a second isometric view of the battery can of FIG. 1A.
Figure 1A:
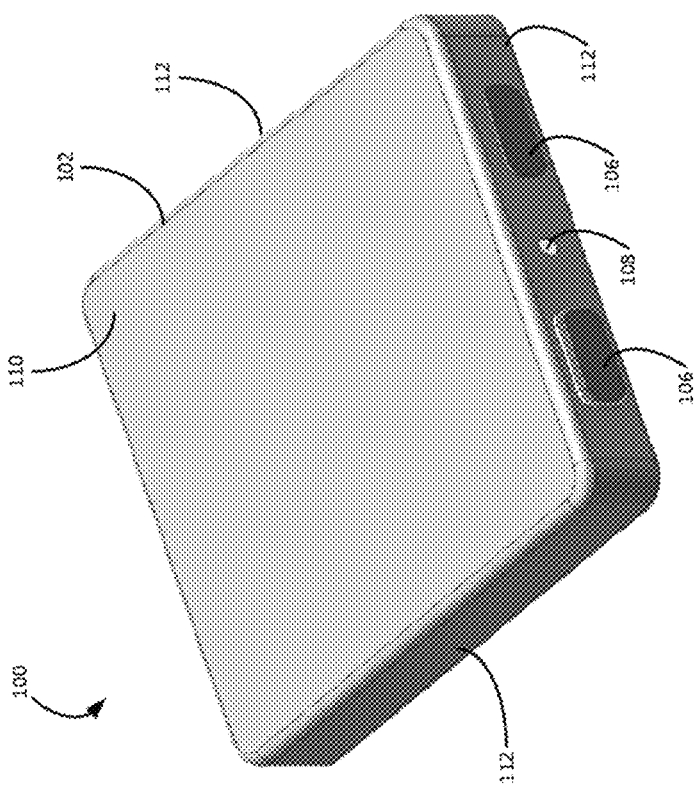
FIG. 1A is a first isometric view of a battery can using two dish or clamshell shaped outer surfaces.

FIGS. 1A and 1B are isometric views of a battery can using two dish or clamshell shaped outer surfaces. In particular, the battery can 100 includes a first portion, or upper portion 102, that has an optionally flat or semi-flat surface 110 and four walls 112 that extend from the flat or semi-flat surface. In general, the dimensions (e.g., width and length) of the flat or semi-flat surface 110 are larger than the dimensions of the walls 112 such that the four walls are smaller in area than the larger flat or semi-flat surface to form a rectangular shape with an opening along one of the larger surfaces of the rectangle. The regions of the first portion 102 where the surface 110 meets the four walls 112 may form an edge. In some embodiments the edge can have a right angle or may be rounded. Similarly, the regions of the first portion 102 where the four walls 112 meet may form a corner; in some embodiments the corner may be a right angle, an obtuse angle, an acute angle or may be rounded. In addition, one or more feedthroughs 106 may be located on a wall 112 of the first portion 102. The feedthroughs 106 provide electrical connections to a battery stack contained within the battery can 100. In addition, one or more fill holes 108 may also be located on a wall 112 of the first portion 102. The fill hole 108 may or may not be on the same wall 112 of the first portion 102 as the feedthroughs 106.

The battery can 100 may also include a second portion 104. In one embodiment, the second portion 104 includes a similar shape as the first portion 102, namely, a flat or semi-flat surface 114 and four walls that extend from the surface to form a rectangular shape with an opening along one of the larger surfaces of the rectangle. The length and width of the flat or semi-flat surface 114 may include slightly smaller dimensions than corresponding dimensions of the flat or semi-flat surface 110 of the first portion 102. Thus, when mated, the walls of the second portion 104 fit inside the walls 112 of the first portion 102 to form a box-like enclosure. In another embodiment, the second portion 104 includes the flat or semi-flat surface 114. In general, the dimensions of the flat or semi-flat surface 114 of the second portion 104 may be the same or similar to the flat or semi-flat surface 110 of the first portion 102 such that, when mated, the first and second portion of the battery can form a box-like enclosure for housing a battery cell.

Figure 2:
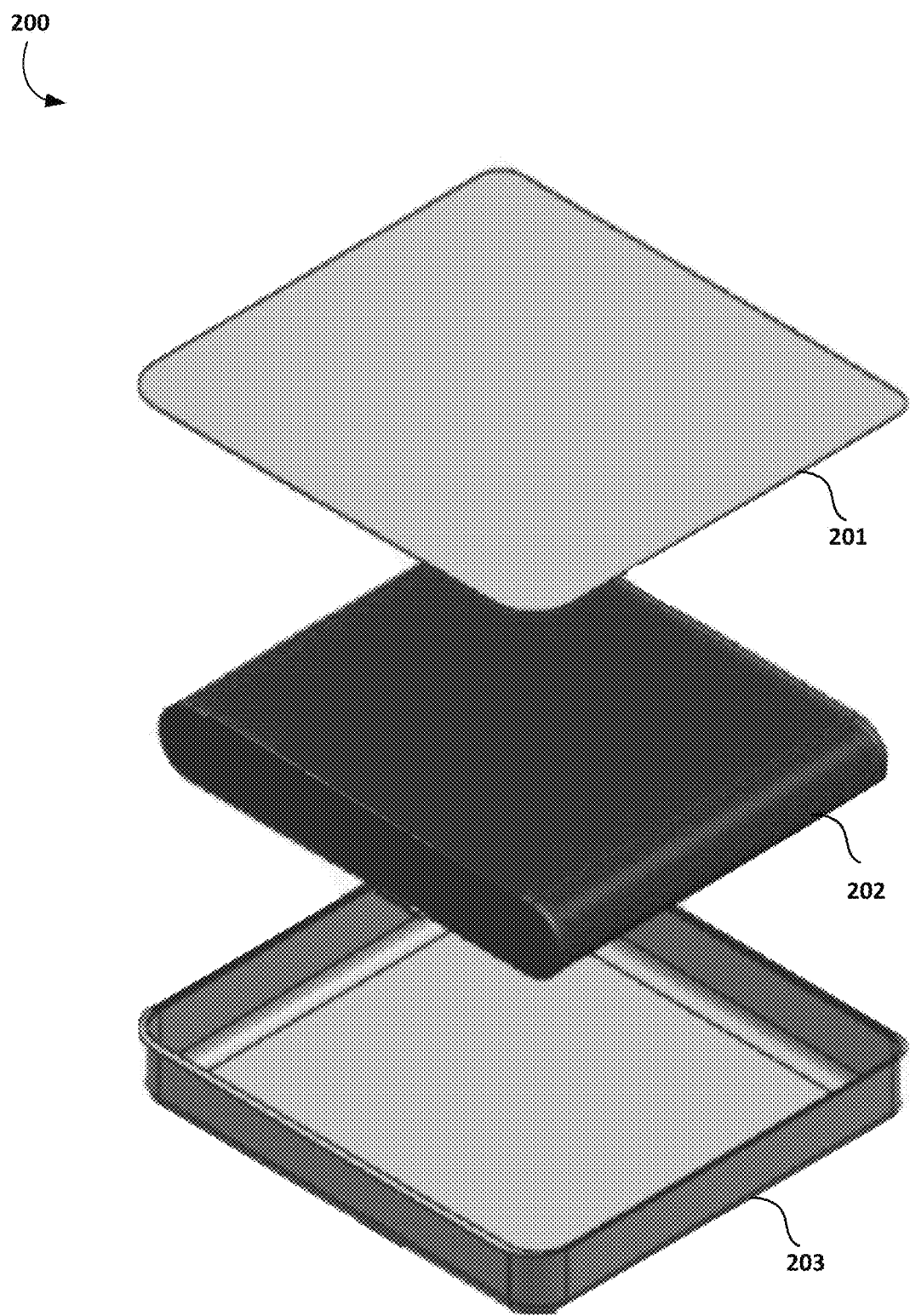
FIG. 2 is an exploded view of a battery can.

FIG. 2 illustrates an exploded view of a battery can 200. The battery can 200 includes a first portion 201 and a second portion 203. The first portion 201 and the second portion 203 may, when mated, enclose a plurality of layers 202 (alternatively referred to as "battery stack").. The plurality of layers 202 may comprise a cathode with an active coating, a separator, and an anode with an active coating. For example, the cathode may be an aluminum foil coated with a lithium compound (e.g., $LiCoO_2$, LiNCoMn, LiCoAl or $LiMn_2O_4$) and the anode may be a copper foil coated with carbon or graphite. The separator may include polyethylene (PE), polypropylene (PP), and/or a combination of PE and PP, such as PE/PP or PP/PE/PP. The separator may comprise a micro-porous membrane that also provides a "thermal shut down" mechanism. If the battery cell reaches the melting point of these materials, the pores shut down which prevents ion flow through the membrane.

The plurality of layers 202 may be wound to form a jelly roll structure or can be stacked to form a stacked-cell structure. The plurality of layers 202 may be immersed in an electrolyte, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

Figure 3:
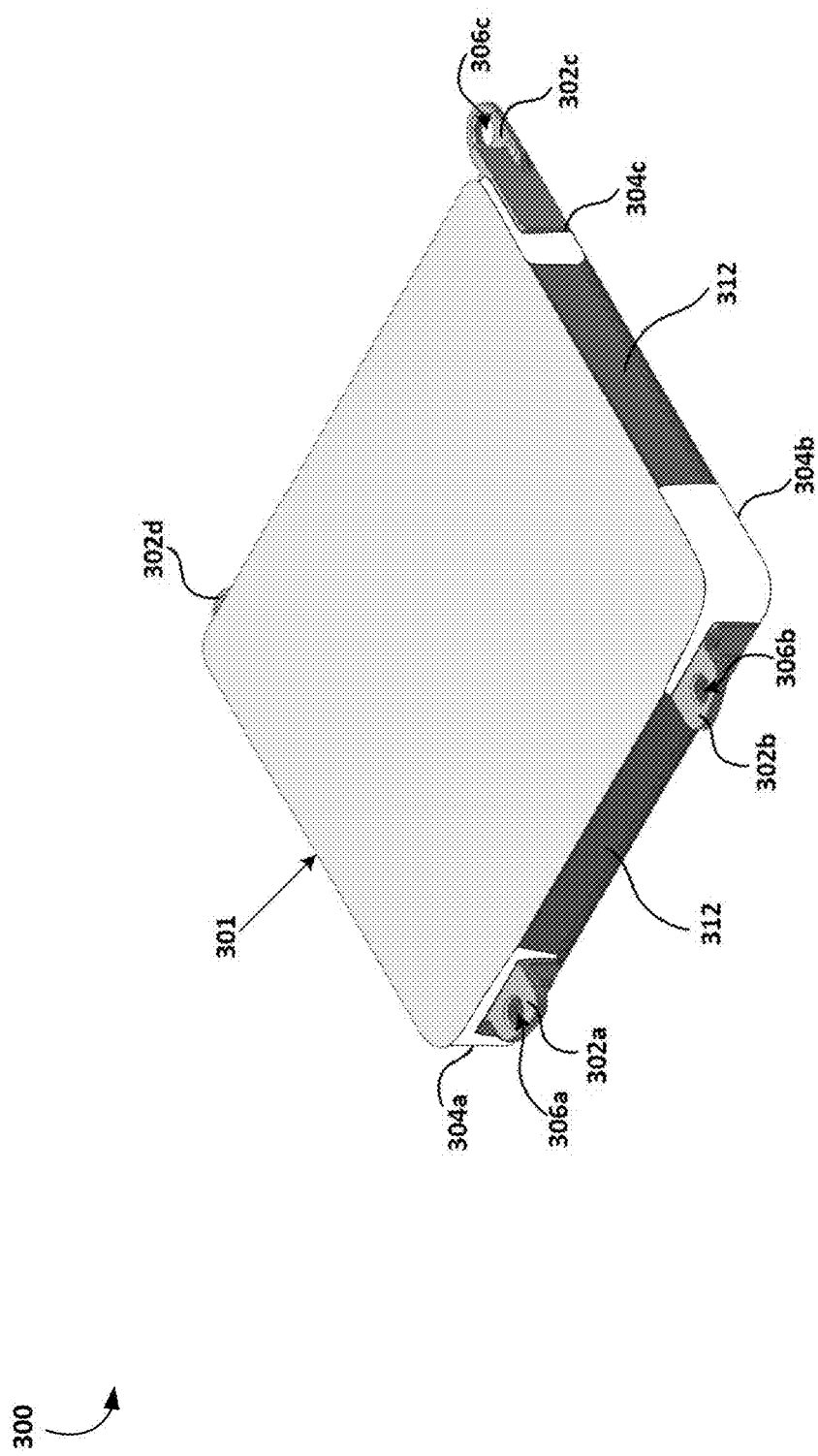
FIG. 3 is an isometric view of a battery pack configured to be structurally mounted to a portable electronic device.

FIG. 3 illustrates an isometric view of a battery pack 300 configured to be structurally mounted to a portable electronic device, in accordance with various aspects of the subject technology. The battery pack 300 comprises an enclosure 301, one or more primary brackets 302a-d, and one or more protectors 304a-d (e.g., protective brackets, protective layer, secondary brackets, etc.).

The enclosure 301 may be formed of a rigid material, such as a metal alloy which may, for example, include stainless steel, aluminum, aluminum alloy, or other sufficiently rigid materials as would be known by a person of ordinary skill in the art. The enclosure 301 may have a non-corrosive coating line the interior of the enclosure 301 and is configured to enclose and protect a plurality of layers (e.g., the plurality of layers 202) within the enclosure. The enclosure 301 may have a cylindrical, cuboid, prism, conical, pyramid, combinations thereof or still other shape.

The one or more primary brackets 302a-d may be connected to at least one wall 312 of the enclosure 301. While the battery pack 300 is illustrated as having four primary brackets 302a-d, it should be appreciated that in other embodiments, the battery pack 300 may include one, two, three, or more than four primary brackets.

The one or more primary brackets 302a-d may be configured to be coupled to a device, such as a portable electronic device. The battery pack 300 may be configured to provide at least one component of the device with power when the one or more primary brackets 302a-d are coupled to the device.

In an embodiment, at least one of the one or more primary brackets 302a-d may comprise an opening 306a-c configured to receive a fastener. The one or more primary brackets 302a-d may be configured to be coupled to the device when one or more of the at least one openings 306a-c receives the fastener. The fastener may, for example, comprise at least one of a screw, a rivet, a nail, a washer, an anchor, and/or any other suitable fastener.

In other embodiments, the one or more primary brackets 302a-d are coupled to the device by fitting or sliding each of the one or more primary brackets 302a-d into a corresponding opening of the device. The corresponding opening(s) may be, for example, slits, pockets, or other openings configured to receive the one or more primary brackets 302a-d. For example, each of the one or more primary brackets 302a-d may be slid into or fit into a slit, pocket, or opening and the one or more primary brackets 302a-d may latch onto the device.

In other embodiments, the one or more primary brackets 302a-d are coupled to the device by attaching each of the one or more primary brackets 302a-d to a corresponding component of the device. For example, the one or more primary brackets 302a-d may be coupled to the device by attaching each of the one or more primary brackets 302a-d to a clip, spring contact, latch, or any other device component capable of being attached to or coupled with the one or more primary brackets 302a-d.

The one or more primary brackets 302a-d may be formed of a rigid material, such as a metal alloy which may, for example, include stainless steel, aluminum, aluminum alloy, or other sufficiently rigid materials as would be known by a person of ordinary skill in the art. In an embodiment, the one or more one or more primary brackets 302a-d may be a different conductive material than the material from which the enclosure 301 is formed.

At least one of the one or more protectors 304a-d may be interposed between at least one of the one or more primary brackets 302a-d and the at least one wall 312 of the enclosure 301. The at least one protector 304a-d may be configured to provide a layer of protection between the at least one primary bracket 302a-d and the plurality of layers enclosed within the enclosure 301. For example, the at least one protector 304a-d may be configured to prevent damage to the plurality of layers and/or to the enclosure 301 when the at least one primary bracket 302a-d is being connected (e.g., welded, laser welded, etc.) to the at least one wall 312 of the enclosure 301. For example, the at least one protector 304a-d may be configured to prevent physical damage and/or heat damage to the plurality of layers and/or to the enclosure 301 when the at least one primary bracket 302a-d is being connected (e.g., welded, laser welded, etc.) to the at least one wall 312 of the enclosure 301.

The one or more protectors 304a-d may be formed of a rigid material, such as a metal alloy which may, for example, include stainless steel, aluminum, aluminum alloy, or other sufficiently rigid materials as would be known by a person of ordinary skill in the art. In an embodiment, the one or more protectors 304a-d may be the same material as the material from which the enclosure 301 is formed. In an embodiment, the one or more protectors 304a-d may be the same material as the material from which the enclosure 301 is formed and the one or more protectors 304a-d may be a different material than the one or more primary brackets 302a-d.

In an embodiment, the one or more primary brackets 302a-d, the one or more protectors 304a-d, and/or the at least one wall 312 of the enclosure all have different thicknesses. The at least one wall 312 of the enclosure 301 may be thin relative to the one or more primary brackets 302a-d. For example, the at least one wall 312 of the enclosure 301 may have a thickness that is less than a thickness of the one or more primary brackets 302a-d.

The one or more protectors 304a-d may have a thickness that is different than the thickness of the at least one wall 312 of the enclosure 301. The one or more protectors 304a-d may have a thickness that is different than the thickness of the one or more primary brackets 302a-d. For example, the one or more protectors 304a-d may have a thickness that is greater than a thickness of the at least one wall 312 of the enclosure 301. The one or more protectors 304a-d may have a thickness that is less than a thickness of the one or more primary brackets 302a-d.

In embodiments, the at least one wall 312 of the enclosure 301 has a thickness less than 75 microns. In other embodiments, the at least one wall 312 of the enclosure 301 has a thickness less than 100 microns. In embodiments, the one or more primary brackets 302a-d have a thickness less than 500 microns. In other embodiments, the one or more primary brackets 302a-d have a thickness less than 400 microns. In embodiments, the one or more protectors 304a-d have a thickness less than 300 microns. In other embodiments, the one or more protectors 304a-d have a thickness less than 200 microns.

In other embodiments, some or all of the one or more primary brackets 302a-d, the one or more protectors 304a-d, and the at least one wall 312 of the enclosure have the same thickness.

As discussed above, batteries usually swell. In a standard cell design, due to the adhesive used to attach the battery pack to the portable electronic device, the battery is only able to swell in one direction (e.g., away from the adhesive). The use of the primary brackets 302a-d and/or the protectors 304a-d to attach the battery pack 300 to the portable electronic device eliminates the need for adhesive. Accordingly, the use of the primary brackets 302a-d and/or the protectors 304a-d provides the battery pack 300 with the ability to swell in any direction.

Depending on the portable electronic device, it may be desirable for the battery pack 300 to swell in a particular direction. The thinnest wall of the battery pack 300 may be the wall of the battery pack 300 that swells. Accordingly, if it is desirable for the battery pack 300 to swell downwards, the bottom surface of the battery pack 300 may be constructed with thinner material than the top surface and/or side walls. Conversely, if it is desirable for the battery pack 300 to swell upwards, the top surface of the battery pack 300 may be constructed with thinner material than the bottom surface and/or side walls.

Figure 4:
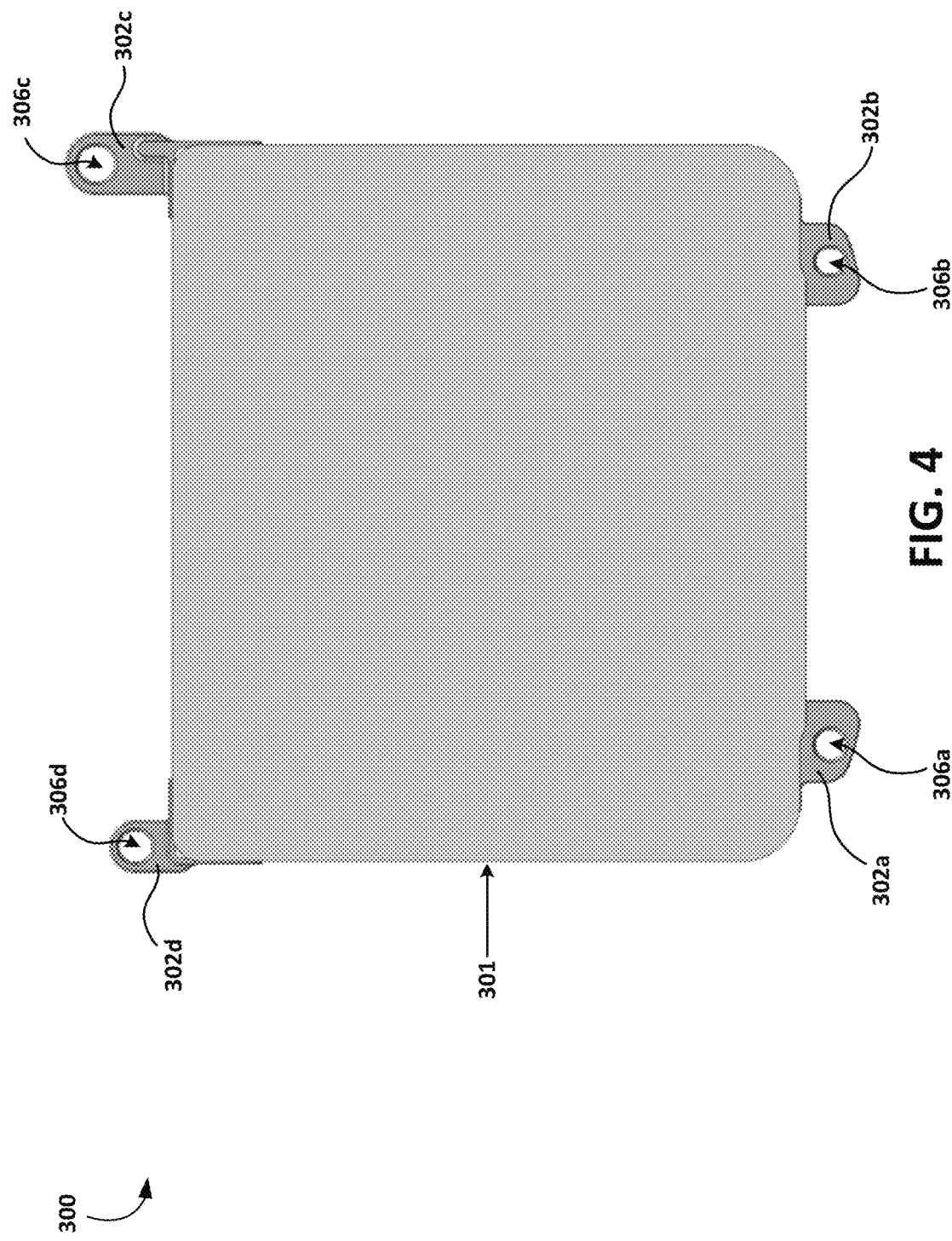
FIG. 4 is a top view of the battery pack of FIG. 3.

FIG. 4 is a top view of the battery pack 300. A portion of each of the one or more primary brackets 302a-d may extend outward from the at least one wall 312 of the enclosure 301. For example, the portion of the one or more primary brackets 302a-d extending outward from the at least one wall 312 of the enclosure 301 may be the portion of the one or more primary brackets 302a-d that are configured to be coupled to a device, such as a portable electronic device.

In an embodiment, the portion of each of the one or more primary brackets 302a-d extending outward from the at least one wall 312 of the enclosure 301 may be the portion of the one or more primary brackets 302a-d that comprises the openings 306a-d configured to receive a fastener. The one or more primary brackets 302a-d may be configured to be coupled to the device when one or more of the at least one openings 306a-d receives the fastener. The fastener may, for example, comprise at least one of a screw, a rivet, a nail, a washer, an anchor, and/or any other suitable fastener.

In other embodiments, the portion of the one or more primary brackets 302a-d extending outward from the at least one wall 312 of the enclosure 301 may be the portion of the one or more primary brackets 302a-d configured to be fit or slid into a corresponding opening of the device. As discussed above, the corresponding opening(s) may be, for example, slits, pockets, or openings configured to receive the portion of the one or more primary brackets 302a-d extending outward from the at least one wall 312 of the enclosure 301. For example, each of the portions may be slid into or fit into a slit, pocket, or opening and the one or more primary brackets 302a-d may latch onto the device.

In other embodiments, the portion of the one or more primary brackets 302a-d extending outward from the at least one wall 312 of the enclosure 301 may be coupled to the device by attaching each of the portion of one or more primary brackets 302a-d to a corresponding component of the device. For example, the portion of the one or more primary brackets 302a-d may be coupled to the device by attaching each the portions to a clip, spring contact, latch, or any other device component capable of being attached to or coupled with the portion one or more primary brackets 302a-d.

Figure 5:
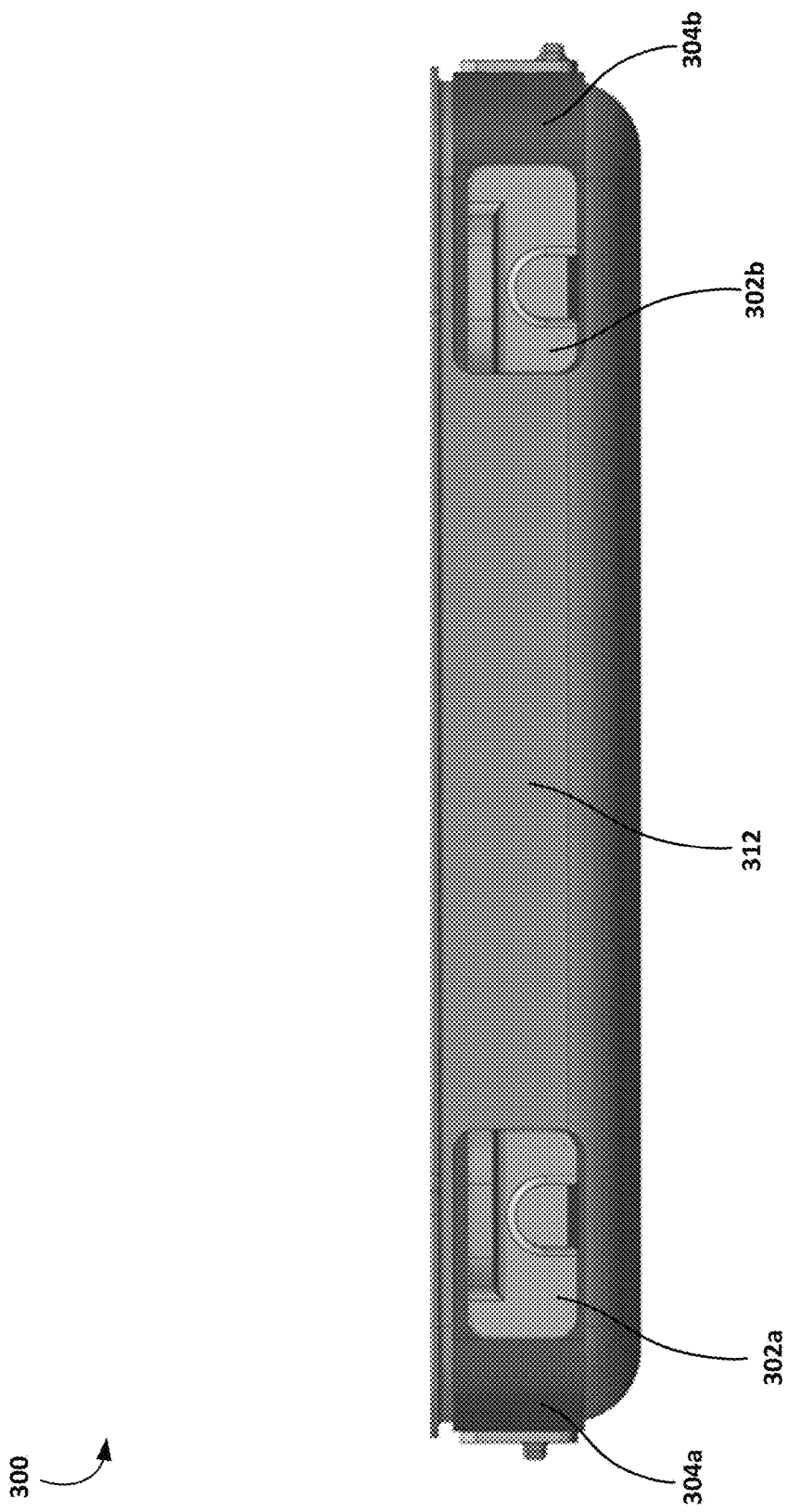
FIG. 5 is a side view of the battery pack of FIG. 3.

FIG. 5 is a side view of the battery pack 300. The one or more primary brackets 302a-b may be connected to the at least one wall 312 of the enclosure 301. Additional primary brackets (e.g., primary brackets 302c-d) may be connected to the at least one wall 312 of the enclosure 301, such as on a different side of the enclosure 301. At least one of the protectors 304a-b may be interposed between at least one of the one or more primary brackets 302a-b and the at least one wall 312 of the enclosure 301. The at least one protector 304a-b may be configured to provide a layer of protection between the at least one primary bracket 302a-b and the plurality of layers enclosed within the enclosure 301. For example, the at least one protector 304a-b may be configured to prevent damage to the plurality of layers and/or to the enclosure 301 when the at least one primary bracket 302a-b is being connected (e.g., welded, laser welded, etc.) to the at least one wall 312 of the enclosure 301.

Figure 6:
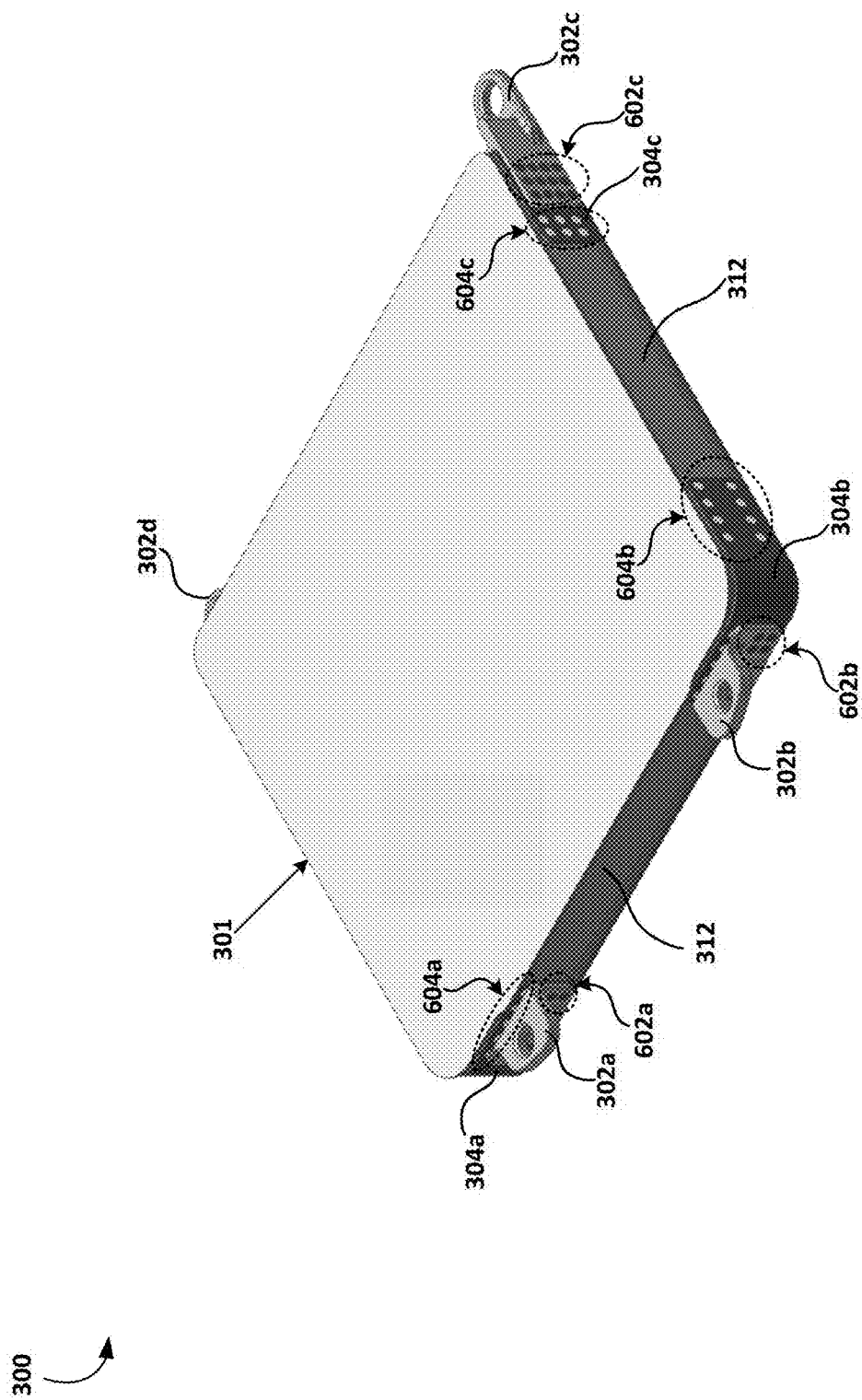
FIG. 6 is a detailed isometric view of the battery pack of FIG. 3.

FIG. 6 is a detailed isometric view of the battery pack 300. As discussed above, the battery pack 300 comprises an enclosure 301, one or more primary brackets 302a-d, and one or more protectors 304a-d.

The enclosure 301 may be formed of a rigid material, such as a metal alloy which may, for example, include stainless steel, aluminum, aluminum alloy, or other sufficiently rigid materials as would be known by a person of ordinary skill in the art.

The one or more primary brackets 302a-d may be formed of a rigid material, such as a metal alloy which may, for example, include stainless steel, aluminum, aluminum alloy, or other sufficiently rigid materials as would be known by a person of ordinary skill in the art. In an embodiment, the one or more one or more primary brackets 302a-d may be a different conductive material than the material from which the enclosure 301 is formed.

The one or more protectors 304a-d may be formed of a rigid material, such as a metal alloy which may, for example, include stainless steel, aluminum, aluminum alloy, or other sufficiently rigid materials as would be known by a person of ordinary skill in the art. In an embodiment, the one or more protectors 304a-d may be the same material as the material from which the enclosure 301 is formed.

The one or more primary brackets 302a-d may be connected to the at least one wall 312 of the enclosure 301. For example, the one or more primary brackets 302a-c may be connected to the at least one wall 312 of the enclosure 301 at connection points 602a-c.

The connection points 602a-c may each include, for example, one or more welds. If the connection points 602a-c include weld(s), the connection points 602a-c may be created by welding the one or more primary brackets 302a-c onto the at least one wall 312 from outside of the enclosure 301. For example, the connection points 602a-c may be created by welding the one or more primary brackets 302a-c onto the at least one wall 312 from outside of the enclosure 301 after a plurality of layers is already enclosed within the enclosure 301. The connection points 602a-c may each include any number of welds.

If a protector 304a-c is interposed between at least one of the one or more primary brackets 302a-c and the at least one wall 312 of the enclosure 301, the connection points 602a-c may be created by welding the one or more primary brackets 302a-c onto the protector 304a-c from outside of the enclosure 301. For example, the connection points 602a-c may be created by welding the one or more primary brackets 302a-c onto the protectors 304a-c from outside of the enclosure 301 after a plurality of layers is already enclosed within the enclosure 301. The at least one protector 304a-c may be configured to prevent damage to the plurality of layers and/or to the enclosure 301 when the at least one primary bracket 302a-c is being connected (e.g., welded, laser welded, etc.) to the at least one wall 312 of the enclosure 301.

Figure 7:
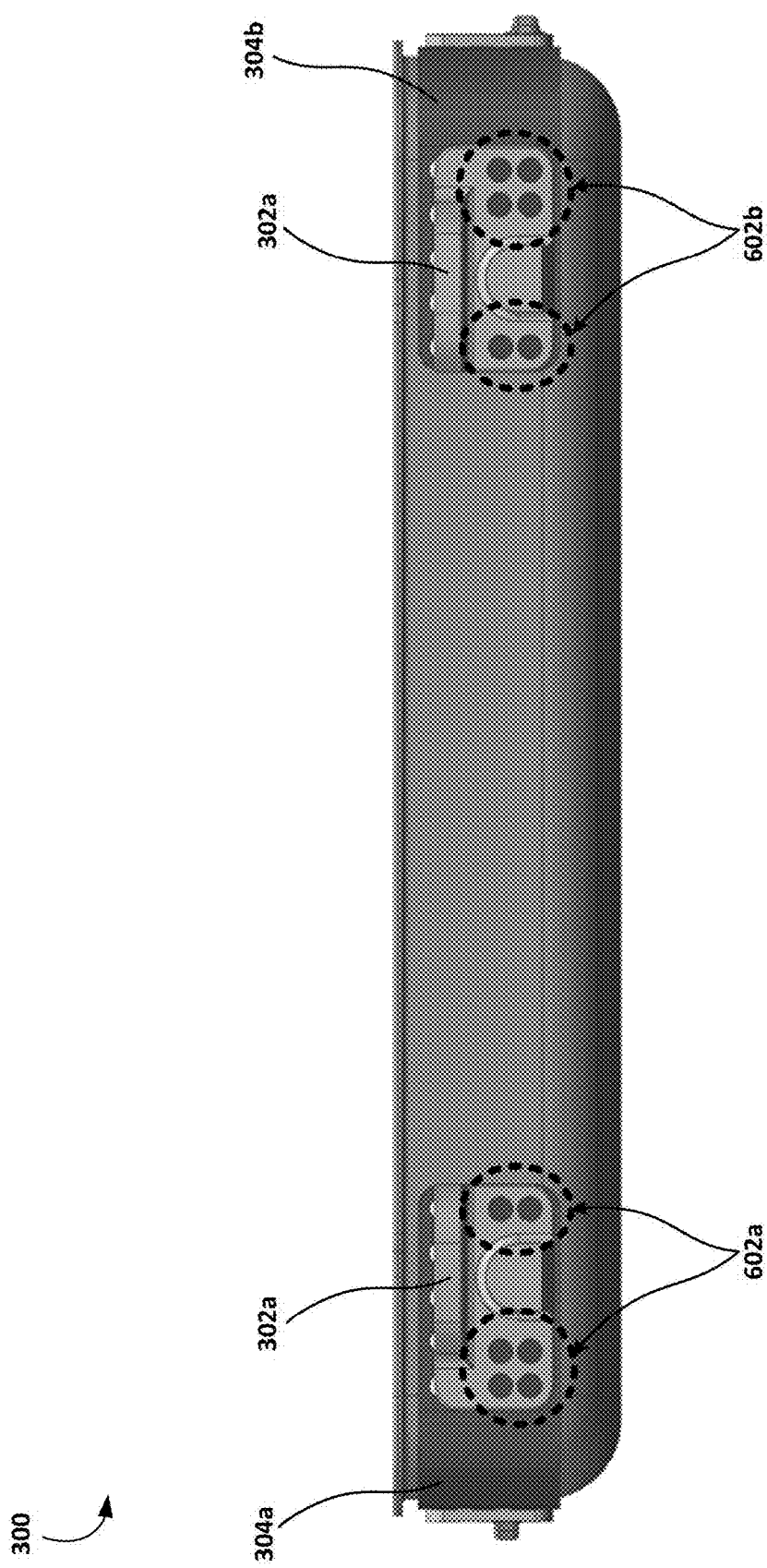
FIG. 7 is a detailed side view of the battery pack of FIG. 3.

FIG. 7 is a detailed side view of the battery pack 300 depicting the connection points 602a-b from a different angle.

While welds associated with the primary bracket 302d are not depicted in FIG. 6, it should be appreciated that the primary bracket 302d may similarly be connected to the at least one wall 312 of the enclosure 301 by welding the primary bracket 302d onto the at least one wall 312 from outside of the enclosure 301 and/or onto the protector 304d from outside of the enclosure 301.

The one or more protectors 304a-d may be connected to the at least one wall 312 of the enclosure 301. For example, the one or more protectors 304a-c may be connected to the at least one wall 312 of the enclosure 301 at connection points 604a-c.

The connection points 604a-c may each include, for example, one or more welds. If the connection points 604a-c include weld(s), the connection points 604a-c may be created by welding the one or more protectors 304a-c onto the at least one wall 312 from inside of the enclosure 301. For example, the connection points 604a-c may be created by welding the one or more protectors 304a-c onto the at least one wall 312 from inside of the enclosure 301 before a plurality of layers is inserted into the enclosure 301. The connection points 604a-c may each include any number of welds.

While welds associated with the protector 304d are not depicted in FIG. 6, it should be appreciated that the protector 304d may similarly be connected to the at least one wall 312 of the enclosure 301 by welding the protector 304d onto the at least one wall 312 from inside of the enclosure 301.

Figure 8B:
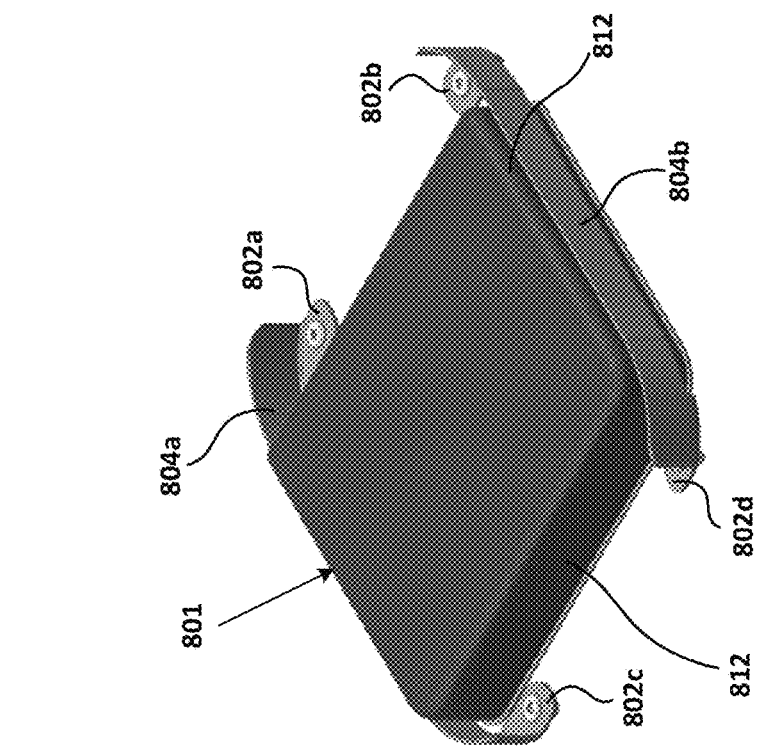
FIG. 8B is an isometric view of the battery pack of FIG. 8A.
Figure 8A:
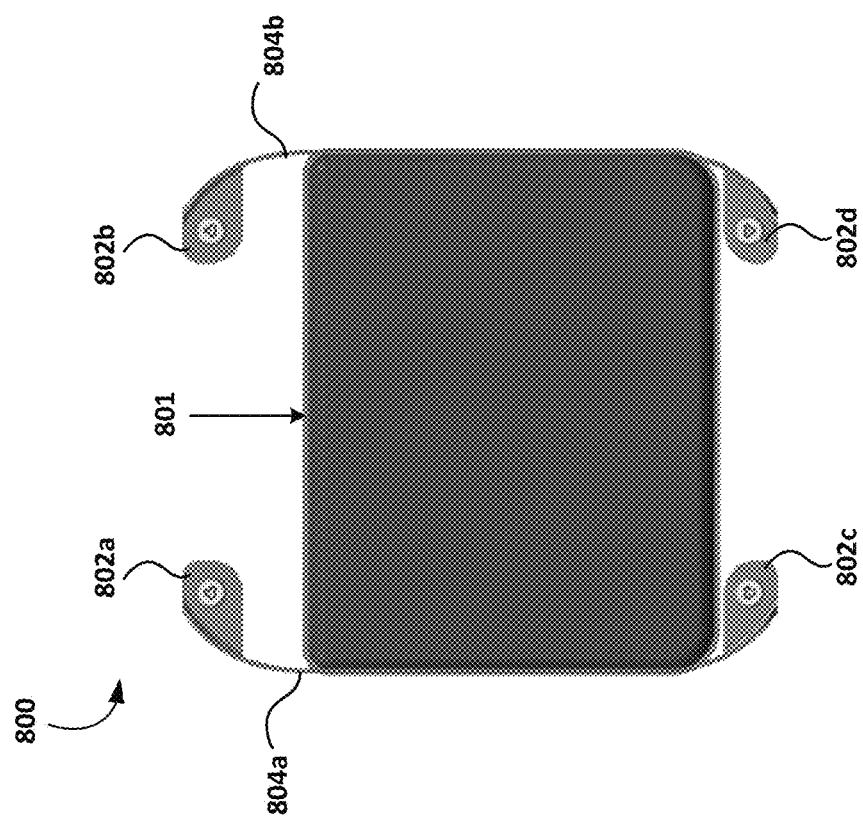
FIG. 8A is a top view of a battery pack configured to be structurally mounted to a portable electronic device.

FIGS. 8A-B illustrate isometric views of a battery pack 800 configured to be structurally mounted to a portable electronic device, in accordance with various aspects of the subject technology. The battery pack 800 comprises an enclosure 801, one or more primary brackets 802a-d, and one or more secondary brackets 804a-b.

The enclosure 801 may be formed of a rigid material, such as a metal alloy which may, for example, include stainless steel, aluminum, aluminum alloy, or other sufficiently rigid materials as would be known by a person of ordinary skill in the art. The enclosure 801 may have a non-corrosive coating line the interior of the enclosure 801 and is configured to enclose and protect a plurality of layers (e.g., the plurality of layers 202) within the enclosure. The enclosure 801 may have a cylindrical, cuboid, prism, conical, pyramid, combinations thereof or still other shape. The enclosure 801 may comprise, for example, the battery can 100 discussed above with reference to FIG. 1.

The one or more primary brackets 802a-d may be connected to at least one wall 812 of the enclosure 301. While the battery pack 800 is illustrated as having four primary brackets 802a-d, it should be appreciated that in other embodiments, the battery pack 800 may include one, two, three, or more than four primary brackets.

The one or more primary brackets 802a-d may be configured to be coupled to a device, such as a portable electronic device. The battery pack 800 may be configured to provide at least one component of the device with power when the one or more primary brackets one or more primary brackets 802a-d are coupled to the device.

In an embodiment, at least one of the one or more primary brackets 802a-d may comprise an opening configured to receive a fastener. The one or more primary brackets 802a-d may be configured to be coupled to the device when one or more of the at least one openings receives the fastener. The fastener may, for example, comprise at least one of a screw, a rivet, a nail, a washer, an anchor, and/or any other suitable fastener.

In other embodiments, the one or more primary brackets 802a-d are coupled to the device by fitting or sliding each of the one or more primary brackets 802a-d into a corresponding opening of the device. The corresponding opening(s) may be, for example, slits, pockets, or openings configured to receive the one or more primary brackets 802a-d. For example, each of the one or more primary brackets 802a-d may be slid into or fit into a slit, pocket, or opening and the one or more primary brackets 802a-d may latch onto the device.

In other embodiments, the one or more primary brackets 802a-d are coupled to the device by attaching each of the one or more primary brackets 802a-d to a corresponding component of the device. For example, the one or more primary brackets 802a-d may be coupled to the device by attaching each of the one or more primary brackets 802a-d to a clip, spring contact, latch, or any other device component capable of being attached to or coupled with the one or more primary brackets 802a-d.

The one or more primary brackets 802a-d may be formed of a rigid material, such as a metal alloy which may, for example, include stainless steel, aluminum, aluminum alloy, or other sufficiently rigid materials as would be known by a person of ordinary skill in the art. In an embodiment, the one or more one or more primary brackets 802a-d may be a different conductive material than the material from which the enclosure 801 is formed.

At least one of the protectors 304a-b may be interposed between at least one of the one or more primary brackets 802a-d and the at least one wall 812 of the enclosure 801. Each of the secondary brackets 804a-b may be interposed between more than one primary brackets 802a-d and the at least one wall 812 of the enclosure 801. The secondary brackets 804a-d are molded/stretched into a different, more elongated shape than the protectors 304a-d discussed above.

However, despite the aesthetic differences, the one or more secondary brackets 804a-b may serve a similar function as the protectors 304a-d discussed above. In particular, the secondary brackets 804a-b may be configured to provide a layer of protection between the at least one primary bracket 802a-d and the plurality of layers enclosed within the enclosure 801. For example, the at least one secondary bracket 804a-b may be configured to prevent damage to the plurality of layers and/or to the enclosure 801 when the at least one primary bracket 802a-d is being connected (e.g., welded, laser welded, etc.) to the at least one wall 812 of the enclosure 801.

The one or more secondary brackets 804a-b may be formed of a rigid material, such as a metal alloy which may, for example, include stainless steel, aluminum, aluminum alloy, or other sufficiently rigid materials as would be known by a person of ordinary skill in the art. In an embodiment, the one or more secondary brackets 804a-b may be the same material as the material from which the enclosure 801 is formed. In an embodiment, the one or more secondary brackets 804a-d may be the same material as the material from which the enclosure 801 is formed and the one or more secondary brackets 804a-d may be a different material than the one or more primary brackets 802a-d.

In an embodiment, the one or more primary brackets 802a-d, the one or more secondary brackets 804a-b, and/or the at least one wall 812 of the enclosure all have different thicknesses. The at least one wall 812 of the enclosure 301 may be thin relative to the one or more primary brackets 802a-d. For example, the at least one wall 812 of the enclosure 801 may have a thickness that is less than a thickness of the one or more primary brackets 802a-d. The one or more secondary brackets 804a-b may have a thickness that is different than the thickness of the at least one wall 812 of the enclosure 801. The one or more secondary brackets 804a-b may have a thickness that is different than the thickness of the one or more primary brackets 802a-d. For example, the one or more secondary brackets 804a-b may have a thickness that is greater than a thickness of the at least one wall 812 of the enclosure 801. The one or more secondary brackets 804a-b may have a thickness that is less than a thickness of the one or more primary brackets 802a-d.

In other embodiments, the one or more primary brackets 802a-d, the one or more secondary brackets 804a-d, and/or the at least one wall 812 of the enclosure have the same thickness.

Figure 9:
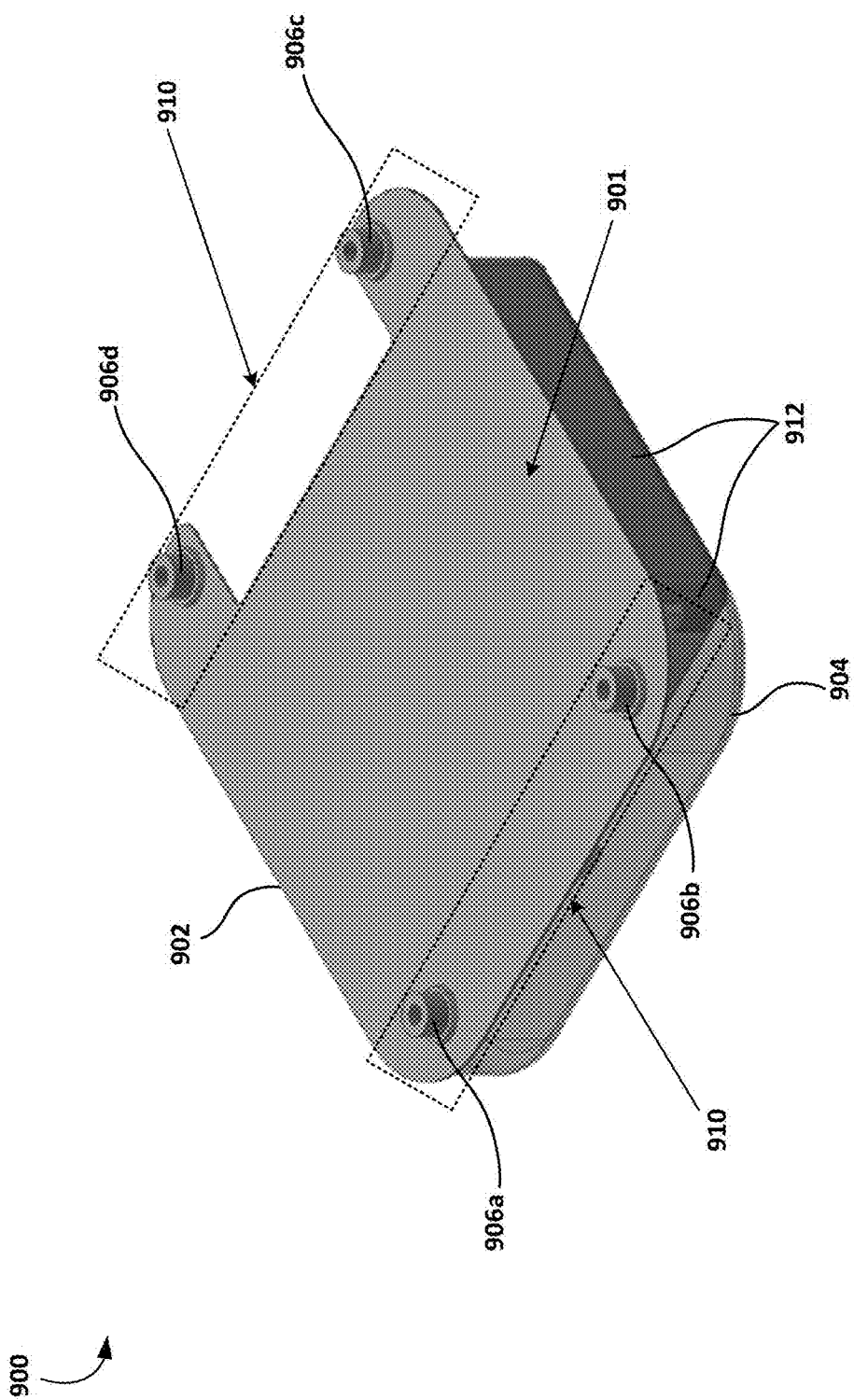
FIG. 9 is an isometric view of a battery pack configured to be structurally mounted to a portable electronic device.

FIG. 9 illustrate isometric views of a battery pack 900 configured to be structurally mounted to a portable electronic device, in accordance with various aspects of the subject technology. The battery pack 900 comprises an enclosure 901.

The enclosure 901 may be formed of a rigid material, such as a metal alloy which may, for example, include stainless steel, aluminum, aluminum alloy, or other sufficiently rigid materials as would be known by a person of ordinary skill in the art. The enclosure 901 may have a non-corrosive coating line the interior of the enclosure 901 and is configured to enclose and protect a plurality of layers (e.g., the plurality of layers 202) within the enclosure. The enclosure 801 may have a cylindrical, cuboid, prism, conical, pyramid, combinations thereof or still other shape. The enclosure 901 may comprise, for example, the battery can 100 discussed above with reference to FIG. 1.

The enclosure 901 may include a first surface 902 and a plurality of walls 912 that extend from the first surface 902 in a direction perpendicular to the first surface 902. A portion 910 of the first surface 902 extends past at least one wall of the plurality of walls 912. The enclosure 901 may include a second surface 904. The second surface 904 may be configured to be connected to the plurality of walls 912 to form a body configured to enclose a plurality of layers (e.g., the plurality of layers 202).

The portion 910 of the first surface 902 may be configured to be coupled to a device, such as a portable electronic device. The battery pack 900 may be configured to provide at least one component of the device with power when the portion 910 of the first surface 902 is coupled to the device.

In an embodiment, the portion 910 of the first surface 902 comprises at least one opening configured to receive a fastener 906*a-d*. The portion 910 of the first surface 902 may be configured to be coupled to the device when the at least one opening receives the fastener 906*a-d*. The fastener 906*a-d* may, for example, comprise at least one of a screw, a rivet, a nail, a washer, an anchor, and/or any other suitable fastener.

In other embodiments, the portion 910 of the first surface 902 is configured to be coupled to an opening in a device enclosure of the device. For example, the portion 910 of the first surface 902 may be configured to be fit or slid into a corresponding opening of the device. As discussed above, the corresponding opening(s) may be, for example, slits, pockets, or any other suitable opening. For example, the portion 910 of the first surface 902 may be fit or slid into a slit, pocket, or opening and the portion 910 of the first surface 902 may latch onto the device.

In other embodiments, the portion 910 of the first surface 902 may be configured to be coupled to a corresponding component or fastener of the device. For example, the portion 910 of the first surface 902 may be coupled to the device by attaching the portion 910 of the first surface 902 to a clip, spring contact, latch, or any other device component capable of being attached to or coupled with the portion 910 of the first surface 902.

Figure 10:
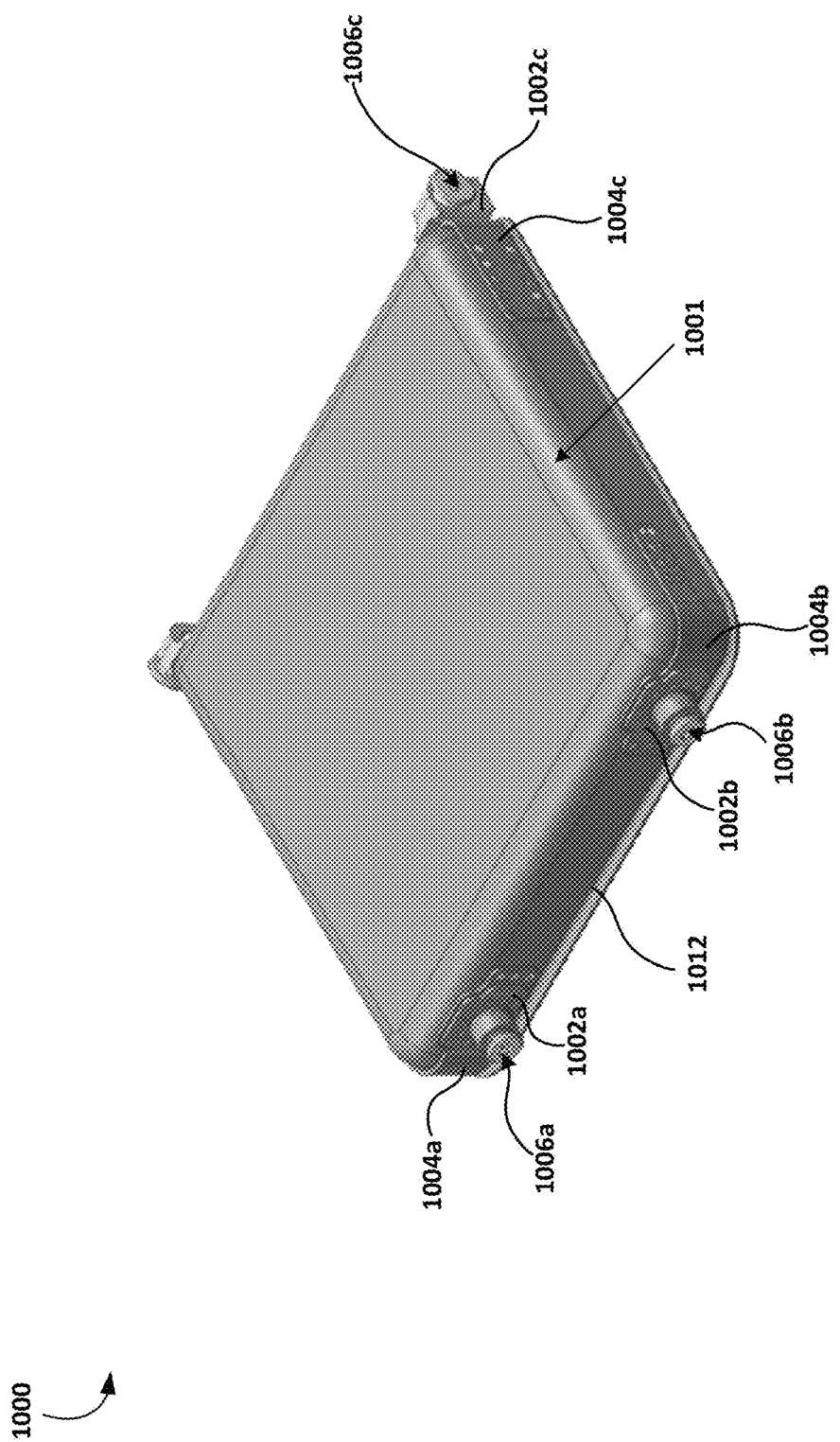
FIG. 10 is an isometric view of a battery pack configured to be structurally mounted to a portable electronic device

FIG. 10 is an isometric view of a battery pack 1000 configured to be structurally mounted to a portable electronic device in accordance with various aspects of the subject technology. The battery pack 1000 comprises an enclosure 1001, one or more primary brackets 1002*a-c*, and one or more secondary brackets 1004*a-c*.

The enclosure 1001 may be formed of a rigid material, such as a metal alloy which may, for example, include stainless steel, aluminum, aluminum alloy, or other sufficiently rigid materials as would be known by a person of ordinary skill in the art. The enclosure 1001 may have a non-corrosive coating line the interior of the enclosure 1001 and is configured to enclose and protect a plurality of layers (e.g., the plurality of layers 202) within the enclosure. The enclosure 1001 may have a cylindrical, cuboid, prism, conical, pyramid, combinations thereof or still other shape. The enclosure 1001 may comprise, for example, the battery can 100 discussed above with reference to FIG. 1.

The one or more primary brackets 1002*a-c* may be connected to at least one wall 1012 of the enclosure 1001. While the battery pack 1000 is illustrated as having three primary brackets 302*a-c*, it should be appreciated that in other embodiments, the battery pack 1000 may include one, two, or more than three primary brackets.

The one or more primary brackets 1002*a-d* may be configured to be coupled to a device, such as a portable electronic device. The battery pack 1000 may be configured to provide at least one component of the device with power when the one or more primary brackets one or more primary brackets 1002*a-d* are coupled to the device.

In an embodiment, at least one of the one or more primary brackets 1002*a-c* may comprise an opening 1006*a-c* configured to receive a fastener. While the one or more primary brackets 302*a-d* discussed above may be configured to receive a fastener in a direction parallel to the at least one wall 312, the one or more primary brackets 1002*a-c* may comprise an opening 1006*a-c* configured to receive a fastener in a direction perpendicular to the at least one wall 1012. The one or more primary brackets 1002*a-c* may be coupled to the device when one or more of the at least one openings 1006*a-c* receives the fastener. The fastener may, for example, comprise at least one of a screw, a rivet, a nail, a washer, an anchor, and/or any other suitable fastener.

In other embodiments, the one or more primary brackets 1002*a-c* are coupled to the device by fitting or sliding each of the one or more primary brackets 1002*a-c* into a corresponding opening of the device. The corresponding opening (s) may be, for example, slits, pockets, or openings configured to receive the one or more primary brackets 1002*a-c*. For example, each of the one or more primary brackets 1002*a-c* may be slid into or fit into a slit, pocket, or opening and the one or more primary brackets 1002*a-c* may latch onto the device.

In other embodiments, the one or more primary brackets 1002*a-c* are coupled to the device by attaching each of the one or more primary brackets 1002*a-c* to a corresponding component of the device. For example, the one or more primary brackets 1002*a-c* may be coupled to the device by attaching each of the one or more primary brackets 1002*a-c* to a clip, spring contact, latch, or any other device component capable of being attached to or coupled with the one or more primary brackets 1002*a-c*.

The one or more primary brackets 1002*a-c* may be formed of a rigid material, such as a metal alloy which may, for example, include stainless steel, aluminum, aluminum alloy, or other sufficiently rigid materials as would be known by a person of ordinary skill in the art. In an embodiment, the one or more one or more primary brackets 1002*a-c* may be a different conductive material than the material from which the enclosure 1001 is formed.

At least one of the one or more secondary brackets 1004*a-c* may be interposed between at least one of the one or more primary brackets 1002*a-c* and the at least one wall 1012 of the enclosure 1001. The at least one secondary bracket 1004*a-c* may be configured to provide a layer of protection between the at least one primary bracket 1002*a-c* and the plurality of layers enclosed within the enclosure 1001. For example, the at least one secondary bracket 1004*a-c* may be configured to prevent damage to the plurality of layers and/or to the enclosure 1001 when the at least one primary bracket 1002*a-c* is being connected (e.g., welded, laser welded, etc.) to the at least one wall 1012 of the enclosure 1001.

The one or more secondary brackets 1004a-c may be formed of a rigid material, such as a metal alloy which may, for example, include stainless steel, aluminum, aluminum alloy, or other sufficiently rigid materials as would be known by a person of ordinary skill in the art. In an embodiment, the one or more secondary brackets 1004a-c may be the same material as the material from which the enclosure 1001 is formed. In an embodiment, the one or more secondary brackets 1004a-c may be the same material as the material from which the enclosure 1001 is formed and the one or more secondary brackets 1004a-c may be a different material than the one or more primary brackets 1002a-c.

In an embodiment, the one or more primary brackets 1002a-c, the one or more secondary brackets 1004a-c, and/or the at least one wall 1012 of the enclosure all have different thicknesses. The at least one wall 1012 of the enclosure 1001 may be thin relative to the one or more primary brackets 1002a-c. For example, the at least one wall 1012 of the enclosure 1001 may have a thickness that is less than a thickness of the one or more primary brackets 1002a-c. The one or more secondary brackets 1004a-c may have a thickness that is different than the thickness of the at least one wall 1012 of the enclosure 1001. The one or more secondary brackets 1004a-c may have a thickness that is different than the thickness of the one or more primary brackets 1002a-c. For example, the one or more secondary brackets 1004a-c may have a thickness that is greater than a thickness of the at least one wall 1012 of the enclosure 1001. The one or more secondary brackets 1004a-c may have a thickness that is less than a thickness of the one or more primary brackets 1002a-c.

In other embodiments, the one or more primary brackets 1002a-c, the one or more secondary brackets 1004a-c, and/or the at least one wall 1012 of the enclosure have the same thickness.

Figure 11:
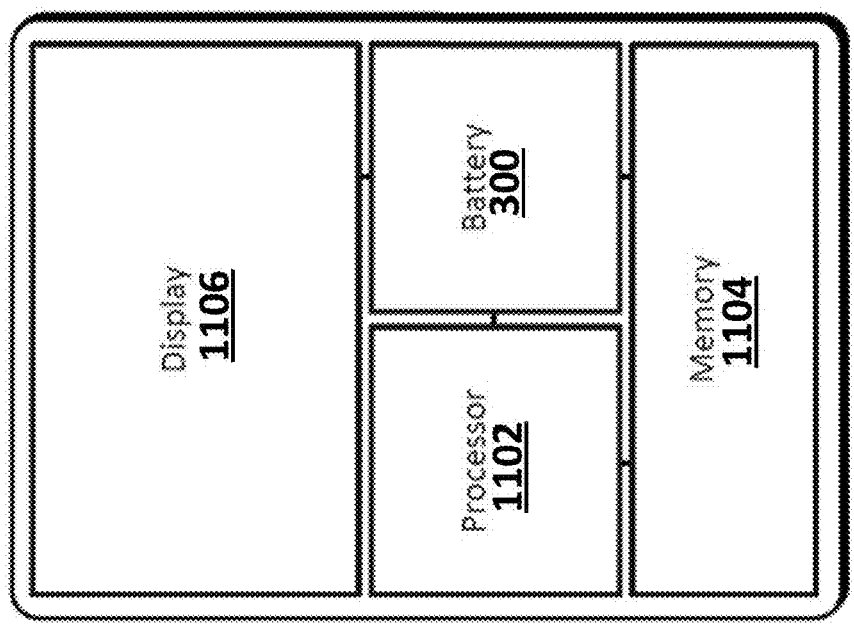
FIG. 11 is a portable electronic device.

FIG. 11 illustrates a portable electronic device 1100, in accordance with various aspects of the subject technology. The batteries 300, 800, 900, or 1000 can generally be used in any type of electronic device. For example, FIG. 11 illustrates a portable electronic device 1100 which includes a processor 1102, a memory 1104 and a display 1106, which are all powered by the battery 300. Portable electronic device 1100 may correspond to a laptop computer, tablet computer, mobile phone, personal digital assistant (PDA), digital music player, watch, and wearable device, and/or other type of battery-powered electronic device.

Battery 300 may correspond to a battery pack that includes one or more battery cells. Each battery cell may include a plurality of layers enclosed within an enclosure. One or more primary brackets may be connected to at least one wall of the enclosure. Each of the one or more primary brackets may configured to be coupled to the device 1100. The battery cell may be configured to provide at least one component of the device 1100 with power when the one or more primary brackets are coupled to the device 1100. A secondary bracket may be interposed between at least one of the one or more primary brackets and the at least one wall of the enclosure. The secondary bracket configured to provide a layer of protection between the at least one primary bracket and the plurality of layers.

While the portable electronic device 1100 is illustrated as including the battery 300, it should be appreciated that, in other embodiments, the portable electronic device 1100 includes the battery 800, the battery 900, or the battery 1000 instead of the battery 300.

Figure 12:
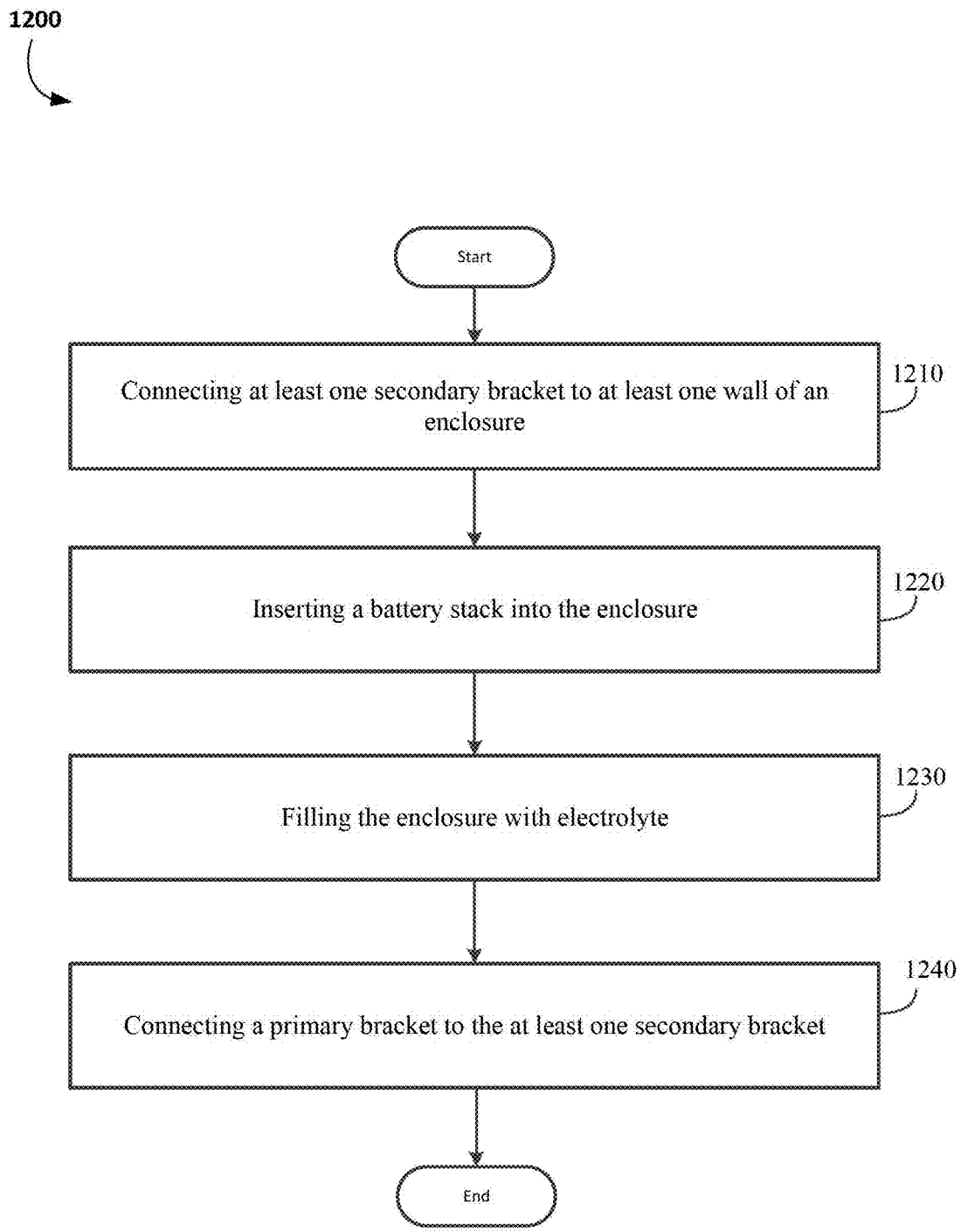
FIG. 12 illustrates an example method for manufacturing a battery pack configured to be structurally mounted to a portable electronic device.

FIG. 12 illustrates an example method 1200 for manufacturing the battery cell 300, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 1210, at least one protector 304a-c may be connected to at least one wall 312 of the enclosure 301. The at least one protector 304a-c may be connected to at least one wall of the enclosure 301 by welding (e.g., laser welding) the at least one protector 304a-c to at least one wall 312 of the enclosure 301, such as from inside the enclosure 301.

At operation 1220, a plurality of layers 202 is inserted within the enclosure 301, such as through an opening in the enclosure 301. The plurality of layers 202 may comprise a cathode with an active coating, a separator, and an anode with an active coating. The plurality of layers 202 may be wound to form a jelly roll structure or can be stacked to form a stacked-cell structure.

At operation 1230, the enclosure 301 may be filled with electrolyte. The plurality of layers 202, for example, may be immersed in an electrolyte, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

At operation 1240, at least one primary bracket 302a-d may be connected to the at least one protector 304a-c. The at least one primary bracket 302a-d may be connected to the at least one protector 304a-c by welding (e.g., laser welding) the at least one primary bracket 302a-d to the at least one protector 304a-c, such as from outside the enclosure 301.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A battery pack comprising:
an enclosure;
a plurality of layers enclosed within the enclosure and immersed in electrolyte, wherein the enclosure comprises:
a first surface and a plurality of walls that extend from the first surface in a direction perpendicular to the first surface; and
a second surface configured to be connected to the plurality of walls to form a body configured to enclose the plurality of layers;
one or more primary brackets connected to at least one wall of the enclosure, wherein each of the one or more primary brackets are configured to be coupled to a device, and wherein the battery pack is configured to provide at least one component of the device with power when the one or more primary brackets are coupled to the device; and a protector interposed between at least one of the one or more primary brackets and the at least one wall of the enclosure, the protector configured to provide a layer of protection between the at least one primary bracket and the plurality of layers.

2. The battery pack of claim 1, wherein each of the one or more primary brackets comprise an opening configured to receive a fastener, and wherein the one or more primary brackets are configured to be coupled to the device when each of the openings receives the fastener.

3. The battery pack of claim 2, wherein the fastener comprises at least one of a screw, a rivet, a nail, a washer, and an anchor.

4. The battery pack of claim 1, wherein the enclosure is a material comprising stainless steel, aluminum, an aluminum alloy, or a combination thereof.

5. The battery pack of claim 1, wherein the at least one wall of the enclosure has a thickness less than or equal to 75 microns.

6. The battery pack of claim 1, wherein the protector is a first material comprising stainless steel, aluminum, an aluminum alloy, or a combination thereof.

7. The battery pack of claim 6, wherein the primary bracket is a second material that is different from the first material.

8. The battery pack of claim 1, wherein the one or more primary brackets have a first thickness and the protector has a second thickness.

9. The battery pack of claim 8, wherein the first thickness is greater than the second thickness.

10. The battery pack of claim 8, wherein the at least one wall of the enclosure has a third thickness, the third thickness being less than the second thickness.

11. A portable electronic device, comprising:
a set of components powered by a battery pack; and
a device enclosure configured to receive the battery pack, the battery pack comprising:
an enclosure;
a plurality of layers enclosed within the enclosure and immersed in electrolyte, wherein the enclosure comprises:
a first surface and a plurality of walls that extend from the first surface in a direction perpendicular to the first surface; and
a second surface configured to be connected to the plurality of walls to form a body configured to enclose the plurality of layers;
one or more primary brackets connected to at least one wall of the enclosure, wherein each of the one or more primary brackets are configured to be coupled to the device enclosure, and wherein the battery pack is configured to provide the set of components with power when the one or more primary brackets are coupled to the device enclosure; and
a protector interposed between at least one of the one or more primary brackets and the at least one wall of the enclosure, the protector configured to provide a layer of protection between the at least one primary bracket and the plurality of layers.

12. The portable electronic device of claim 11, wherein each of the one or more primary brackets comprise an opening configured to receive a fastener, and wherein the one or more primary brackets are configured to be coupled to the device enclosure when each of the openings receives the fastener.

13. The portable electronic device of claim 12, wherein the fastener comprises at least one of a screw, a rivet, a nail, a washer, and an anchor.

14. The portable electronic device of claim 11, wherein the enclosure is a material comprising stainless steel, aluminum, an aluminum alloy, or a combination thereof.

15. The portable electronic device of claim 11, wherein the at least one wall of the enclosure has a thickness less than or equal to 75 microns.

16. The portable electronic device of claim 11, wherein the protector is a first material comprising stainless steel, aluminum, an aluminum alloy, or a combination thereof.

17. The portable electronic device of claim 16, wherein the primary bracket is a second material that is different from the first material.

18. The portable electronic device of claim 11, wherein the one or more primary brackets have a first thickness and the protector has a second thickness.

19. The portable electronic device of claim 18, wherein the first thickness is greater than the second thickness.

20. The portable electronic device of claim 17, wherein the at least one wall of the enclosure has a third thickness, the third thickness being less than the second thickness.

* * * * *